(12) United States Patent
Gindele et al.

(10) Patent No.: US 6,785,421 B1
(45) Date of Patent: Aug. 31, 2004

(54) ANALYZING IMAGES TO DETERMINE IF ONE OR MORE SETS OF MATERIALS CORRESPOND TO THE ANALYZED IMAGES

(75) Inventors: Edward B. Gindele, Rochester, NY (US); Wei Zhu, Rochester, NY (US); Rajiv Mehrotra, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/576,558

(22) Filed: May 22, 2000

(51) Int. Cl.$^7$ ................................................. G06K 9/64
(52) U.S. Cl. ....................... 382/217; 382/119; 382/225; 705/14; 707/3
(58) Field of Search ............................ 382/118, 190, 382/217, 218, 224–225; 707/2–6; 705/14; 709/219

(56) References Cited

U.S. PATENT DOCUMENTS

| | | | |
|---|---|---|---|
| 5,579,471 A | | 11/1996 | Barber et al. |
| 5,696,964 A | * | 12/1997 | Cox et al. ..................... 707/5 |
| 5,819,288 A | | 10/1998 | De Bonet |
| 5,832,131 A | | 11/1998 | Choo et al. |
| 5,933,823 A | | 8/1999 | Cullen et al. |
| 5,963,670 A | * | 10/1999 | Lipson et al. ............... 382/224 |
| 5,987,456 A | | 11/1999 | Ravela et al. |
| 6,035,055 A | * | 3/2000 | Wang et al. ................. 382/118 |
| 6,104,835 A | * | 8/2000 | Han .............................. 382/225 |
| 6,128,663 A | * | 10/2000 | Thomas ....................... 709/228 |
| 6,154,771 A | * | 11/2000 | Rangan et al. .............. 709/217 |
| 6,285,788 B1 | * | 9/2001 | Sezan et al. ................. 382/217 |
| 6,295,061 B1 | * | 9/2001 | Park et al. ................... 345/764 |
| 6,295,526 B1 | * | 9/2001 | Kreiner et al. ................. 707/2 |
| 6,379,251 B1 | * | 4/2002 | Auxier et al. ................. 463/42 |
| 6,389,417 B1 | * | 5/2002 | Shin et al. ...................... 707/6 |
| 6,487,538 B1 | * | 11/2002 | Gupta et al. .................. 705/14 |
| 6,496,857 B1 | * | 12/2002 | Dustin et al. ............... 709/219 |
| 6,513,052 B1 | * | 1/2003 | Binder ......................... 707/204 |
| 6,519,584 B1 | * | 2/2003 | Tognazzini et al. ............ 707/3 |
| 6,539,375 B2 | * | 3/2003 | Kawasaki ....................... 707/5 |

OTHER PUBLICATIONS

M. J. Swain and D. H. Ballard in "Color Indexing, Intl. Journal of Computer Vision", vol. 7, No. 1, 1991, pp. 11–32.

G. Pass et al. in "Comparing Images Using Color Coherence Vectors", Proceedings ACM Multimedia Conf., 1996.

* cited by examiner

*Primary Examiner*—Bhavesh M. Mehta
*Assistant Examiner*—Gregory Desire
(74) *Attorney, Agent, or Firm*—Raymond L. Owens

(57) ABSTRACT

A method of analyzing one or more images of a user to determine the likelihood of user interest in materials that can be sent for display to the user includes selecting one or more images by a user; automatically analyzing the one or more user images to determine the likelihood that materials in a set will be of interest to the user; and selecting one or more items of materials based on their likelihood of interest to the user.

13 Claims, 9 Drawing Sheets

ANALYZING IMAGES TO DETERMINE IF ONE OR MORE SETS OF MATERIALS CORRESPOND TO THE ANALYZED IMAGES

Reference is made to commonly assigned U.S. patent application Ser. No. 09/291,857, filed Apr. 14, 1999 entitled "Perceptually Significant Feature-Based Image Archival and Retrieval" by Wei Zhu et al., the disclosure of which is incorporated herein by reference.

FIELD OF THE INVENTION

The present invention relates to analyzing one or more images of a user to determine the likelihood of user interest in materials that can be sent to the user.

BACKGROUND OF THE INVENTION

Photographic imaging service applications have been extended to include digital imaging technology. For Internet-based photographic service applications a consumer is provided a means for displaying his/her digital images with the digital images residing on a remote computer. Typical scenarios for these Internet-based digital imaging applications includes the viewing thumbnail versions of a collection of digital images, selection of a particular digital image for viewing,,enhancement, and/or printing. While there exist many different methods for an Internet-based photographic service provider to receive payment for the service rendered, many have chosen to display advertisement messages on the consumer's display screen and collect payment not from the consumer but from an advertisement client. At present, it is possible for the photographic service provider to perform directed advertisement if prior knowledge of the consumer in the form of a consumer profile is available. However, if no prior knowledge of the consumer is available directed advertising is not possible. Furthermore, the consumer profile may not be up-to-date. Moreover, the profile may not account for some facets of a consumer's buying habits. If an employee of the photographic service provider were to view the consumer's photographs, the employee could make intelligent decisions as to which advertisement client would most likely desire directed advertisement to the particular consumer. Aside from issues of privacy of consumer photographs, the process of humans observing photographs and making directed advertising decisions is too costly for consideration. Research has shown that unrelated directed advertisements are often considered nuisance by the consumer while directed advertisement which relate to the interests of the consumer are considered desirable. Digital imaging algorithms have for a long while been devised to analyze the content of digital images. In particular, the methods disclosed by Cullen et al. in U.S. Pat. No. 5,933,823, Ravela et al. in U.S. Pat. No. 5,987,456, and De Bonet et al. in U.S. Pat. No. 5,819,288 analyze digital images. In these digital imaging applications a database of digital images is maintained. For each digital image in the database a set of image features, expressed in mathematical form, are calculated. A query digital image is selected, usually initiated from the user of the digital imaging application, and compared to the digital images in the database. The same set of image features is calculated for the query digital image. A comparison between the calculated image features for the query digital image and the database digital images is performed and yields an image similarity value for each of the database digital images as a measure of overall similarity. The image similarity values are analyzed and the digital images with the highest image similarity values are displayed for the user.

While these digital image query applications are capable of analyzing digital images, none of the above mentioned disclosed methods relate the content of a set of consumer digital images to the likelihood of an advertisement client's desire to direct advertisement material to that particular consumer.

SUMMARY OF THE INVENTION

It is an object of the present invention to provide a digital imaging algorithm which can make intelligent directed advertising decisions by analyzing the image content of consumer digital image.

It is another object of the present invention to make use of a content of a user's image(s) to determine the likelihood that materials would be of interest to the user. Such materials can include products or services promotional materials.

This object is achieved by a method of analyzing one or more images of a user to determine the likelihood of user interest in materials that can be sent for display to the user, comprising:

a) selecting one or more images by a user;
b) automatically analyzing the one or more user images to determine the likelihood that materials in a set will be of interest to the user; and
c) selecting one or more items of materials based on their likelihood of interest to the user.

Advantages

It is an advantage of the present invention that it provides an advertiser or other purveyor of information with the opportunity to automatically make intelligent directed advertising decisions by analyzing the image content of consumer digital image.

It is another advantage of the present invention that by making use of a content of a user's image(s), the likelihood can efficiently and effectively be determined that materials would be of interest to the user. It is a feature of the invention that such materials can include products or service promotional materials.

DETAILED DESCRIPTION OF THE INVENTION

In the following description, a preferred embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected form such systems, algorithms, components, and elements known in the art. Given the description as set forth in the following specification, all software implementation thereof is conventional and within the ordinary skill in such arts.

Internet-Based Digital Imaging System Application

Figure 2:
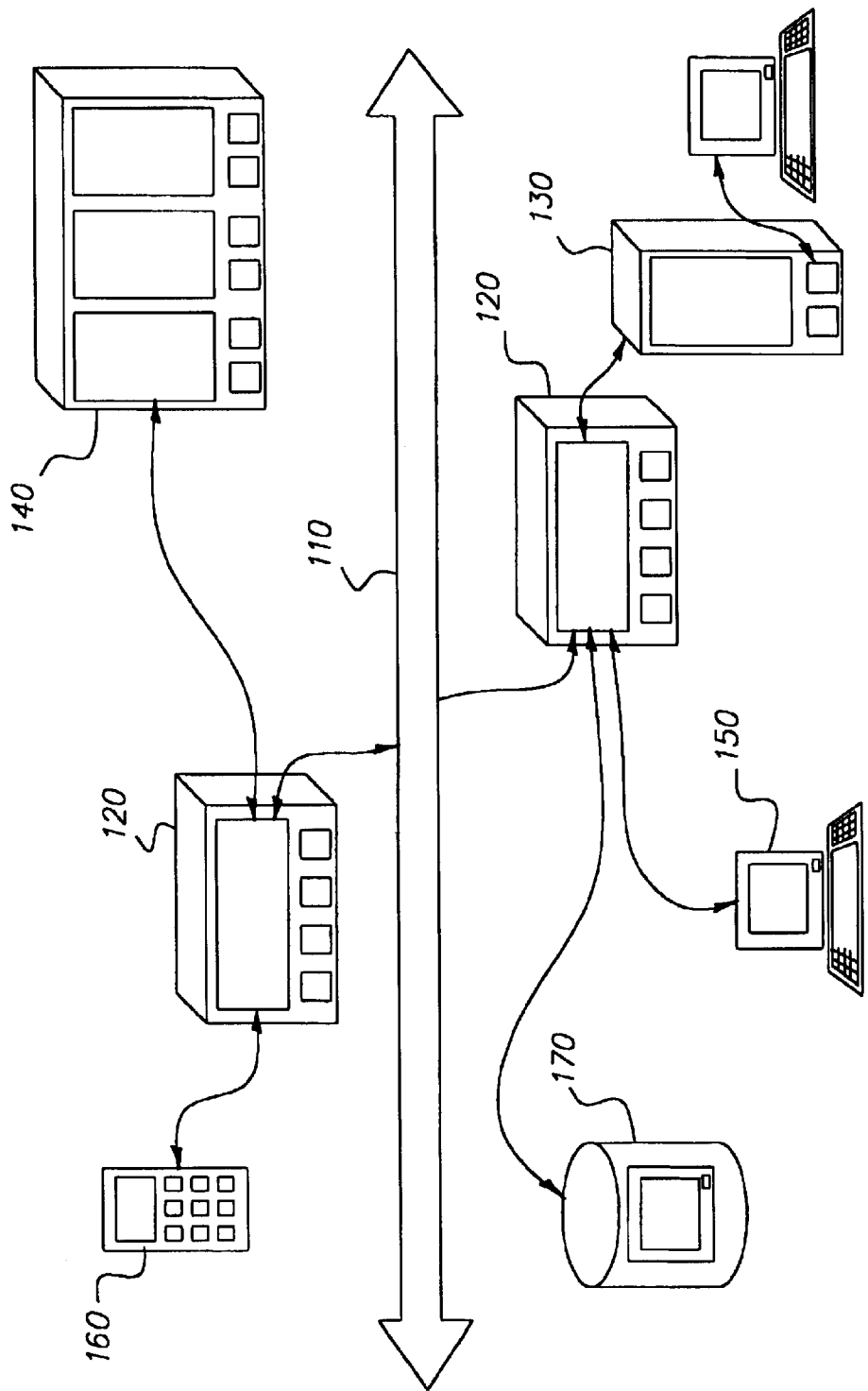
FIG. 2 is a block diagram showing communications network of connected computers suitable for practicing the present invention.

The present invention may be implemented with multiple computers connected via a communications network. A communications network of multiple computers is illustrated in FIG. 2. Such a network of connected computers provides a means of sending and receiving information between any two or more connected computers. A communications network may include physical connections from one computer to another such as can be achieved with a conventional communications phone line. It is also possible for the communications network to include non-physically connected communications lines such as can be achieved with microwave communications links, radio communications links, coaxial cable television communications links, fiber optic communication links, or cellular telephone communications links. Thus the present invention may be practiced with any of the communications systems mentioned above, but is not limited solely to these systems since the present invention relies on exchange of information not the means of achieving the exchange of information.

An image capable computer 100 is any device capable of executing a series of computational instructions which includes the manipulation of digital image data. Although fundamentally any image capable computer may have the capability to perform any computational instructions, the image capable computers illustrated in FIG. 2 have been given specialized names to emphasize the special purpose functions they perform. Some examples of image capable computers are a connection computer 120, retail computer 130, wholesale computer 140, personal computer 150, mobile computer 160, and kiosk computer 170. The present invention may be practiced with, but is not limited to, all of the above examples of image capable computers. It should also be considered that a given computer may be configured to perform more than one function illustrated in FIG. 2. However, for the purposes of discussion of the present invention, the specialized functions will be referred to as separate entities even though the physical implementation of the computer hardware may not always be separate.

The connection computer 120 shown in FIG. 2 refers to a specialized computer device which has been configured for the purposes of connecting other computers to the communications computer network 110. Such a computer may be the communications connection for the other types of computers shown—a retail computer 130, a wholesale computer 140, a personal computer 150, a mobile computer 160, and a kiosk computer. The main function performed by a connection computer 120 is the facilitation of transfer or exchange of information rather than the processing of information. A single connection computer may be connected to many other computers. As illustrated in FIG. 2, both connection computers shown are connected to multiple other computers and to each other. The arrows in the diagram of FIG. 2 represent the exchange of information, which in general, is bi-directional i.e., the flow of information may be achieved in either direction. Since information may flow from computer to computer for the computers, a network of connected computers is formed.

Computers not shown in diagram of FIG. 2 might be connected symbolically via the communications computer network 110. Thus any computer connected to another computer which is connected to the communications network is also connected and may exchange information with any other computer connected to the network. For the purposes of the discussion of the present invention the collection of inter-connected computers including the communications network will be referred to as the Internet.

A personal computer 150, a mobile computer 160, and a kiosk computer 170 are shown connected to the communications computer network 110 via a connection computer 120. These computers have the capability for the exchange and display of information. In particular, as it relates to the present invention, these computers have the ability to, but are not limited to, the display of text, graphic, and image information. Such a computer is typically connected to the Internet with software which understands a variety of protocols and manages the visual display of information. One such combination of display software and software protocol is a World Wide Web (WWW) browser which understands Hypertext Markup Language (HTML). Other display software and other software protocols exist. The present invention is not limited to a Web browser processing HTML documents and may be practiced with any combination of software which manages and displays information.

A personal computer 150 represents a computer which is often operated by a single person at a time. Typical personal computers are installed in homes and businesses. Individual users may access the Internet with a connected personal computer. Personal computers may be portable units such as a lap-top computer. If a personal computer is connected to the Internet with a wireless connection it may be located almost anywhere. In such a configuration, the personal computer may represent a mobile computer 160. Fundamentally, a mobile computer and personal computer may differ mostly in size and weight.

A kiosk computer 170 represents a computer which may be dedicated to a commercial task of performing a specialized service. These computers are generally owned and maintained by businesses and operated primarily by consumers. An automatic teller machine (ATM) is an example of a kiosk computer. A typical kiosk computer might include a means for displaying information, selecting service choices, and indicating a payment method for the service selection. Although these three features of a typical kiosk computer are common, the present invention may be practiced with kiosk computers with fewer or more features than the ones described.

A retail computer 130 represents a computer which may also be dedicated to a commercial task of performing a specialized service set in a retail business. These computers are generally owned and maintained by the retail business and operated either by consumers or store personnel. Typical retail computers may include a variety of devices connected.

Referring to FIG. 2, a wholesale computer 140 represents a computer which may also be dedicated to a commercial task of performing a specialized service. These computers are generally dedicated to high volume processing tasks of large amounts of data. For example, a wholesale computer may contain specialized hardware that enables particularly fast computation of image processing functions. The main difference between a retail computer 130 and a wholesale computer 140 is in the emphasis or level of user or operator assistance required for the software running on these computers. The retail computer 130 emphasizes the human interaction with the software while the wholesale computer 140 emphasizes the automatic mode of the software. Since the wholesale computer 140 in general is computationally faster than the retail computer 130, images to be processed may be sent from the retail computer 130 to the wholesale computer 140, processed on the wholesale computer 140, and sent back via the communications computer network 110 to the retail computer 130.

It is assumed that all of the above mentioned computers may have the capability to store the computational instructions, or software in a variety of means which include, but are not limited to, random access memory (RAM), read only memory (ROM), or some form of off-line storage means such as magnetic or optical storage devices.

Description of an Image and a Digital Image

An image can refer to any form of visual information in recorded or displayed form. Examples of recorded images may include, but are not limited to, a photographic film negative, a photographic slide film, a motion picture film, and a photographic print. Displayed forms of images may include, but are not limited to, visual presentations made on electronic displays such as CRT monitors, LCD panels, electroluminescent devices, and LASER projection systems.

A digital image is comprised of one or more digital image channels. Each digital image channel is comprised of a two-dimensional array of pixels. Each pixel value relates to the amount of light received by the image capture device 10 corresponding to the geometrical domain of the pixel. For color imaging applications a digital image will typically consist of red, green, and blue digital image channels. Although the preferred embodiment of the present invention is practiced with digital images produced with a capture device 10, the present invention is not limited to pixel data relating to photographs . For example, graphic or other synthetic data may be merged with photographically captured pixel data and still be considered a digital image. Other configurations are also practiced, e.g. cyan, magenta, and yellow digital image channels. For monochrome applications, the digital image consists of one digital image channel. Motion imaging applications can be thought of as a time sequence of digital images. Those skilled in the art will recognize that the present invention may be applied to, but is not limited to, a digital image for any of the above mentioned applications. Although the present invention describes a digital image channel as a two dimensional array of pixel values arranged by rows and columns, those skilled in the art will recognize that the present invention can be applied to mosaic (non rectilinear) arrays with equal effect.

Description of a Image Capable Computer

Figure 3:
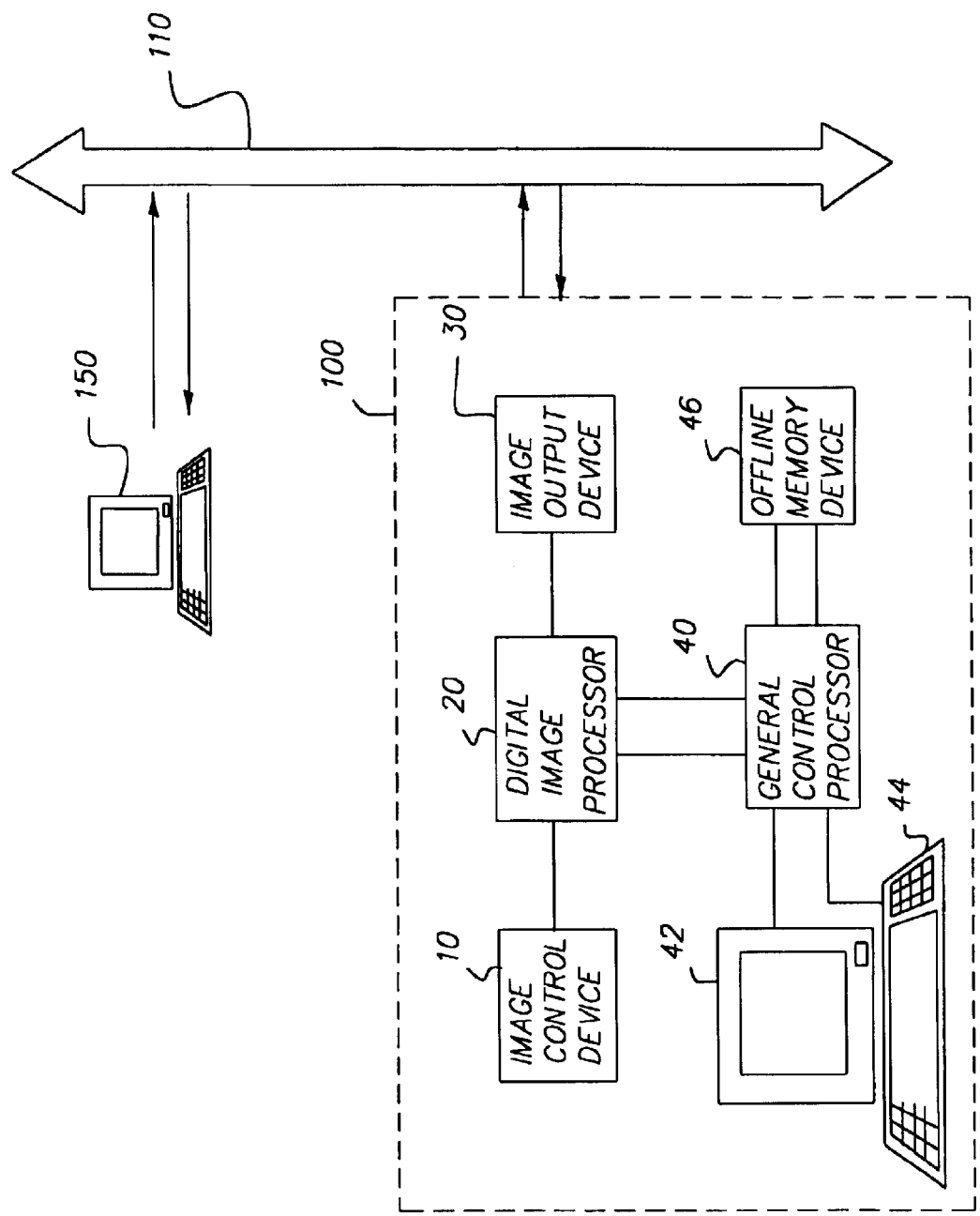
FIG. 3 is a block diagram showing two computers connected via a communications network including a digital image processor and general control processor suitable for practicing the present invention.

The present invention may be implemented in a combination of computer hardware software as shown in FIG. 3 within an image capable computer 100. Although the preferred embodiment of the present invention is most logical to place in a retail computer 130 or wholesale computer 140, both of these devices are image capable computers 100. The following description relates to a digital imaging system as a subset of the components of an image capable computer 100 which includes an image capture device 10, a digital image processor 20, an image output device 30, and a general control processor 40. The system may include a monitor device 42 such as a computer console or paper printer. The system may also include an input device control for an operator such as a keyboard and or mouse pointer 44. Multiple capture devices 10 may be connected to the digital image processor as the present invention may be used with digital images derived from a variety of imaging devices. For example, FIG. 3 may represent a digital photofinishing system where the image capture device 10 is a conventional photographic film camera for capturing a scene on color negative or reversal film and a film scanner device for scanning the developed image on the film and producing a digital image. The digital image processor 20 provides the means for processing the digital images to produce pleasing looking images on the intended output device or media or alternatively, for analyzing the content of processed digital images. Although a single image output devices 30 is shown, the present invention may be used in conjunction with a variety of image output devices 30 which may include a digital photographic printer and soft copy display. The digital image processor 20 may process the digital image to adjust the overall brightness, tone scale, image structure etc. of the digital image in a manner such that a pleasing looking image is produced by an image output device 30. Those skilled in the art will recognize that the present invention is not limited to just these mentioned image processing modules.

The general control processor 40 shown in FIG. 3 may store the present invention as a computer program stored in a computer readable storage medium, which may comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device 46. Before describing the present invention, it facilitates understanding to note that the present invention is preferably utilized on any well known computer system, such as a personal computer 150.

It should also be noted that the present invention implemented in a combination of software and/or hardware is not limited to devices which are physically connected and/or located within the same physical location. One or more of the devices illustrated in FIG. 3 may be located remotely and may be connected via a wireless connection.

Overview of an Image Comparison Digital Imaging System

The diagram illustrated in FIG. 3 shows two computer systems as connected together via a communications computer network 110. The image capable computer 100 is connected to the communications computer network 110 and receives a set of query digital images which originated from a consumer (a person or persons). The retail computer analyzes the set of query digital images for image content with respect to a pre-existing database of digital images. The analysis of the set of query digital images results in the selection of one or more distribution items from a database of distribution items which are related to the pre-existing database of digital images. The set of query digital images and the one or more distribution items are transmitted by the image capable computer 100 and received by the personal computer 150 via the communications computer network 110. The details of the configurations of how the image capable computer 100 receives and/or generates the set of query digital images, how the set of query digital images is analyzed, and how the distribution items are selected and transmitted will be discussed in more detail below.

Description of Distribution Items

Figure 1:
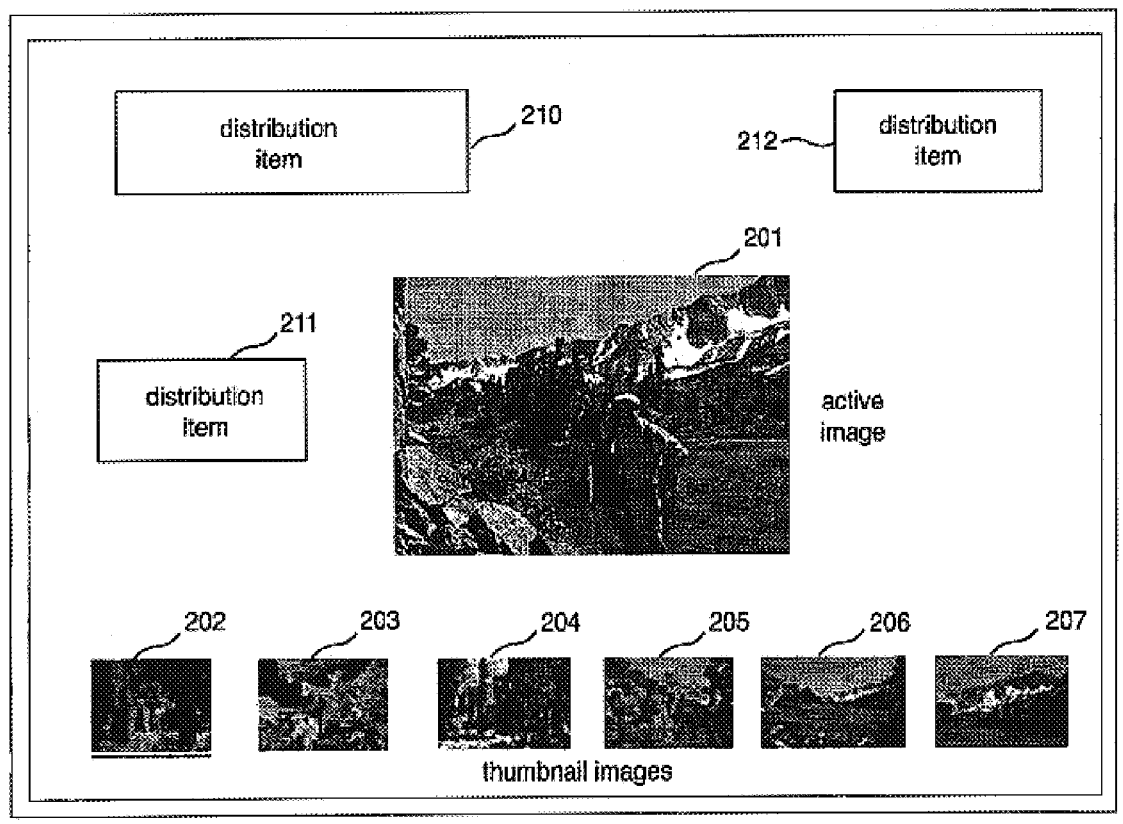
FIG. 1 is a pictorial diagram showing an display of images and promotional material produced by the present invention.

The distribution items are received by a personal computer 150 as shown in FIG. 3. FIG. 1 shows an example display screen as presented on a monitor device 42 connected to the personal computer 150 shown in FIG. 3. Referring to FIG. 1, the items 201, 202, 203, 204, 205, 206, and 207 are displayed versions of the digital images included in the set of query digital images 220. While the user is browsing the active image, meaning a large display of a digital image 201, some of the other individual digital images included in the set of query digital images 220 are displayed as thumbnail images, or small displays, represented by 202, 203, 204, 205, 206, and 207. The distribution items received are presented on the same display screen and are represented by distribution items 210, 211, and 212. Examples of distribution items that may be practiced with the present invention may include, but is not limited to, digital images for promotional purposes, graphic or text images which contain promotional messages, combinations of digital images merged with graphic or text images, video clips, documents which contain promotional messages, HTML web documents, email messages, and world-wide-web addresses (Webster).

The present invention may also be practiced with distribution items that do not have a visual representation such as auditory messages in the form of audio clips. These audio forms of distribution items the personal computer 150 can display the information through its internal speaker.

An alternative embodiment of the present invention is practiced with distribution items that are not in electronic form. For example, such distribution items may include, but are not limited to, printed materials or free promotional materials products or services. An example of a promotional material or product would be a sample of shampoo, soap, or toothpaste. An example of a promotional service would be a coupon for a car wash. For this embodiment of the present invention the image capable computer 100 shown in FIG. 2 receives a set of query digital images from a consumer via the communications computer network 110. The general control processor 40 shown in FIG. 3 (as a component of the image capable computer 100) transmits a message on a monitor device 42 in the form of a paper printout device or a electronic display. One or more of the individual digital images included in the set of query digital images 220 is printed on the image output device 30 resulting in a set of digital prints. The set of digital prints, along with the distribution items are packaged together and send through a delivery carrier service, such as a mail service, to the consumer.

Alternatively, the present invention may be practiced with a set of comparison digital images which are not received by the image capable computer 100 shown in FIG. 2 electronically. For this alternative embodiment of the present invention the image consumer travels to the location of the image capable computer 100 and physically delivers a set of photographic images at the retail store site. The photographic images may be stored electronically on a portable computer memory device, such as a floppy diskette. The digital images stored on the portable computer memory device are then read by an image capture device 10, shown in FIG. 3, such as a floppy diskette drive. The digital images are thus transferred from the portable computer memory device to the digital image processor 20 and constitute the set of query digital images 220.

The consumer may also have a set of photographic film negatives which are physically brought to the retail store. For this case, an image capture device 10, as shown in FIG. 3, is a photographic film scanner. The set of query digital images is produced by image capture device 10 and received by the digital image processor 20. As another scenario, the consumer travels to a retail store which does not have a digital imaging equipment. The set of photographic film negatives is received by the personnel of the retail store. The photographic film negatives are then transmitted to a wholesale business which includes a connected wholesale computer 140 as shown in FIG. 2. The wholesale computer 140 includes an image capable computer 100 as shown in FIG. 3. The set of query digital images and the distribution items are handled in similar fashion as described above and are delivered through a delivery carrier service, either back to a retail store or directly to the consumer. As still another scenario, the consumer has a photographic film scanner connected to a personal computer. The digital images produced with the a photographic film scanner are received by the retail or wholesale computer electronically.

Details of the Comparison Logic

Figure 4:
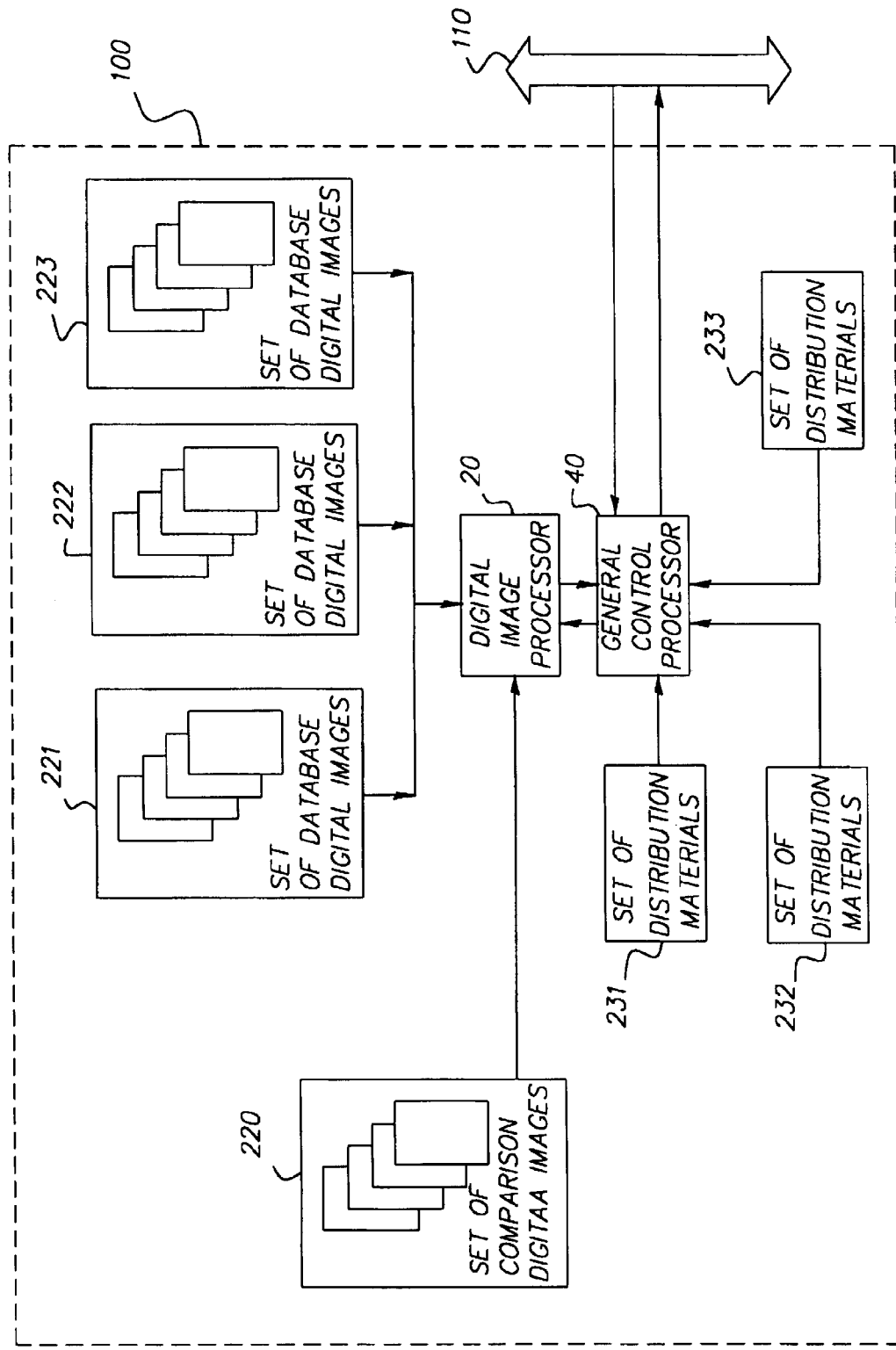
FIG. 4 is a block diagram showing computer which includes a digital image processor.

The digital imaging components of the image capable computer 100 shown in FIG. 3 is illustrated in more detail in FIG. 4. The digital image processor 20 receives multiple sets of database digital images indicated by items 221, 222, and 223. Each set of database digital images contains one or more digital images. Also received by the digital image processor 20 is a set of query images 220 which contains of one or more digital images. While a set of database digital images and a set of query digital images are fundamentally both a collection of digital images, the use of these two different sets of digital images is different as practiced by the present invention. Alternatively, the set of query images 220 and the multiple sets of database images 221, 222, and 223 may have be been initially received by the general control processor 40, stored in an offline memory device 46, and then transmitted to the digital image processor 20.

The individual digital images which make up a set of database digital images are related images which have been chosen to be representative of a particular theme. Digital images relating to an ocean/beach resort may be collected to form a set of database images representing a ocean/beach resort theme. For example, the digital images in a set of database digital images may include images of the beach with sky and clouds, tropical trees, images with sailboats, or images with swimming pools. The important aspect of a set of database digital images is that the set of images as a whole represent the particular theme. Another example of a particular theme would be automobiles. An example set of database images might include individual digital images of automobiles, groups of automobiles, distant automobiles on a race track, or people congregating around a food stand. Here, too, the individual digital images constituting a set of database digital images are related which supports a particular theme.

Let the multiple sets of database digital images be represented by E with each set of database digital images identified with by an index j. Thus $E_j$ refers to the $j^{th}$ set of database digital images. Each set of database digital images may contain a different number of digital images. Let N represents multiple numbers with $N_j$ representing the $j^{th}$ number indicating the number of digital images in the $j^{th}$ set of database digital images received by the digital image processor 20. The individual digital images of a set of database digital images are identified with an index k. Thus the $k^{th}$ digital image of the $j^{th}$ set of database digital images is represented symbolically as $F_{jk}$. The $j^{th}$ set of database digital images is represented as $$E_j = \{F_{j1}, F_{j2}, \ldots, F_{jNj}\}. \quad (1)$$

The individual digital images contained in the set of query digital images also relate to a single person, a single family, or group of related people and represents a collection of consumer digital images. The set of query digital images may vary in number and may have been collected over relatively short period of time of minutes or hours or over a relatively long period of time such as months or years. The important aspect of the set of query digital images is the fact that the individual digital images relate to one or more activities of importance to the person or people who are either photographed in the digital images or photographed by the person or people. The individual digital images of the set of query digital images are identified with by an index i. The set of query digital images is represented as $$Q = \{Q_1, Q_2, \ldots, Q_M\} \quad (2)$$

where M represents the number of digital images included in the set of query digital images and $Q_i$ represents the $i^{th}$ individual digital image of the set.

Referring to FIG. 4, the general control processor 40 receives multiple sets of database digital images. Although there are three sets shown in FIG. 4 (items 221, 222, and 223), the present invention may be practiced with any number of sets of database digital images. For practical reasons, the number of sets may be limited to the amount of available computer memory, however, the present invention as disclosed does not place any restriction on the number of sets of database digital images or the number of digital images contained in a set of database digital images. Similarly, the set of query digital images is not restricted in number of individual digital images.

The digital images processor 20 analyzes the set of query digital images with respect to multiple set of database digital images. More specifically, the individual digital images of the set of query digital images are analyzed with respect to the individual digital images of the multiple sets of database digital images.

The numerical analysis performed by the digital image processor 20 results in a database similarity table 252, represented by the variable γ, which is a set of database similarity values, i.e. one database similarity value corresponding to each set of database digital images where $\gamma_j$ represents the database similarity value of the $j^{th}$ set of database digital images. The database similarity values included in the database similarity table 252 are single numerical values which are an indication of how similar the set of query digital images 220 are to each set of database digital images. Thus the database similarity table 252 contains information which relates the set of query digital images 220 to the individual sets of database digital images 221, 222, and 223.

The general control processor 40 shown in FIG. 4 receives the database similarity table 252 and multiple sets of distribution materials indicated by items 231, 232, and 233. Each set of distribution material includes one or more distribution items as described above. The preferred embodiment of the present invention uses one set of distribution materials corresponding to each set of database digital images. The general control processor 40 uses the database similarity table 252 to determine how to distribute the distribution items included in the sets of distribution materials. The database similarity values are assessed and the general control processor 40 selects one or more distribution items from one or more sets of distribution materials to transmit to the consumer's personal computer 150. The details of the how the database similarity values $\gamma_j$ are calculated is described in more detail below.

Details of the Selection of Distribution Items for Display or Distribution

Figure 5:
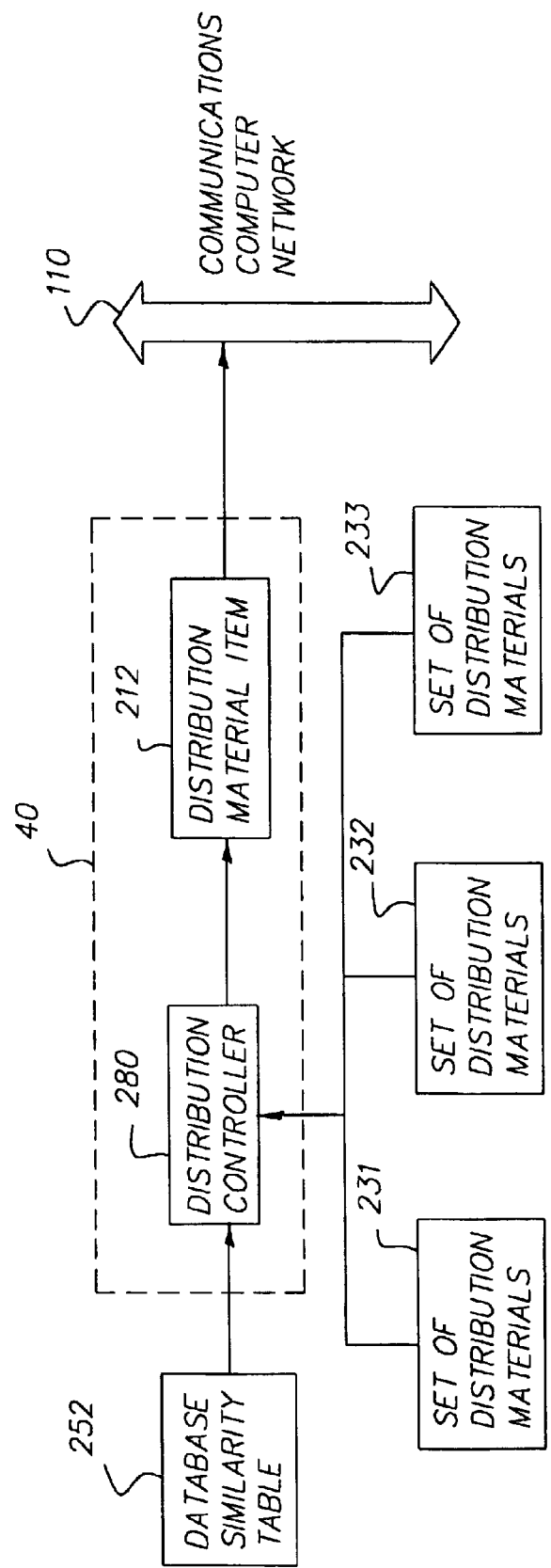
FIG. 5 is a block diagram showing the details of the general control processor.

The details of the general control processor 40 shown in FIG. 4 is illustrated in more detail in FIG. 5. The database similarity table 252 is received by the distribution controller 280 which analyzes the individual database similarity values included in the database similarity table. The individual database similarity values $\gamma_j$ included in the database similarity table γ are sorted in descending order to produce a database ranking table 254 represented by the variable R. The indices of the ranking process are saved in a table of numbers. This table of number is essentially a look-up-table of the relative similarity of the set of query digital images to the individual sets of database digital images. For example, if five sets of database digital images are received and the corresponding database similarity table 252 is given by $$\gamma = \{89\ 45\ 73\ 62\ 91\}, \quad (3)$$

the resulting database ranking table 254 is given by $$R = \{5\ 1\ 3\ 4\ 2\}. \quad (4)$$

Referring to FIG. 4, the database similarity values $\gamma_j$ produced by the digital image processor 20 range in numerical value from 0 to 100. Higher values represent a greater degree of similarity. The preferred embodiment of the present invention selects the set of database digital images with the greatest degree of similarity to the set of query digital images 220. Thus the set of database digital images with the highest corresponding database similarity value, represented by the numerical index $R^1$, is selected and also selects the set of distribution materials corresponding to the selected set of database digital images.

The display screen on the consumer's personal computer 150 can display one or more than one distribution items. The selected set of distribution materials may have more distribution items than the personal computer can display at one time. The preferred embodiment of the present invention cycles through the selected set of distribution materials by selecting individual distribution items for transmission to the personal computer 150. For example, if the personal computer 150 has the ability of displaying two distribution items and the selected set of distribution materials includes ten distribution items, the first two distribution items are selected, transmitted, and displayed on the personal computer 150. After a time period of five seconds, the next two distribution items, the third and fourth, are selected, transmitted, and displayed on the personal computer 150. This process is repeated until all of the individual distribution items included in the selected set of distribution items has been transmitted and displayed at which point the process of cycling through the distribution items is repeated.

Those skilled in the art will recognize that the present invention may be used effectively with other configurations of sequencing through a set of distribution items. For example, once the set of distribution materials is determined, the individual distribution items may be selected at random. This type of display of information breaks up the monotony for the person viewing the display screen. It should also be noted that the time period of displaying distribution items is completely up to the digital imaging application designer.

An alternative embodiment of the present invention displays distribution items from more than one set of distribution. In this embodiment, individual distribution items from two or more sets of distribution materials are selected, transmitted, and displayed on the personal computer 150. The two sets of database digital images with the two highest associated database similarity values are selected (indicated by indices R1 and R2). If the personal computer has the ability to display two distribution items at a time, one distribution item from the first set of distribution materials is displayed in a portion of the personal computer display while one distribution item from the second set of distribution materials is displayed in the other portion. Each of the sets of the distribution materials is cycled through the respective individual distribution items as described above.

Another alternative embodiment of the present invention displays distribution items from one or more sets of distribution materials simultaneously and varies the length of time that the distribution items are displayed on the personal computer 150. In this embodiment, individual distribution items from two or more sets of distribution materials are selected, transmitted, and displayed on the personal computer 150. In each portion of the personal computer 150 devoted to displaying a distribution item, a distribution item selected from the set of distribution materials with the highest associated database similarity value is selected ($R_1$), transmitted, and displayed. These distribution items are displayed for eight seconds. After eight seconds have elapsed, a distribution item from the set of distribution materials with the next highest associated database similarity value is selected ($R_2$), transmitted, and displayed. These distribution items are displayed for three seconds. In this manner, the length of time devoted to the display of distribution items is related to the corresponding database similarity values. The process continues until all of the sets of distribution materials have been selected.

Those skilled in the art will recognize that the present invention may be used effectively with other configurations of varying the length of time devoted to the display of distribution items. For example, the set of distribution materials may be selected at random with the individual distribution items cycled sequentially. Each time a distribution item is selected, the length of time it remains on the personal computer display is determined by its associated database similarity value. It should also be noted, as above, that the actual length of time for displaying a distribution item is completely up to the designer of the digital imaging application.

Calculation of the Database Similarity Values

Figure 6:
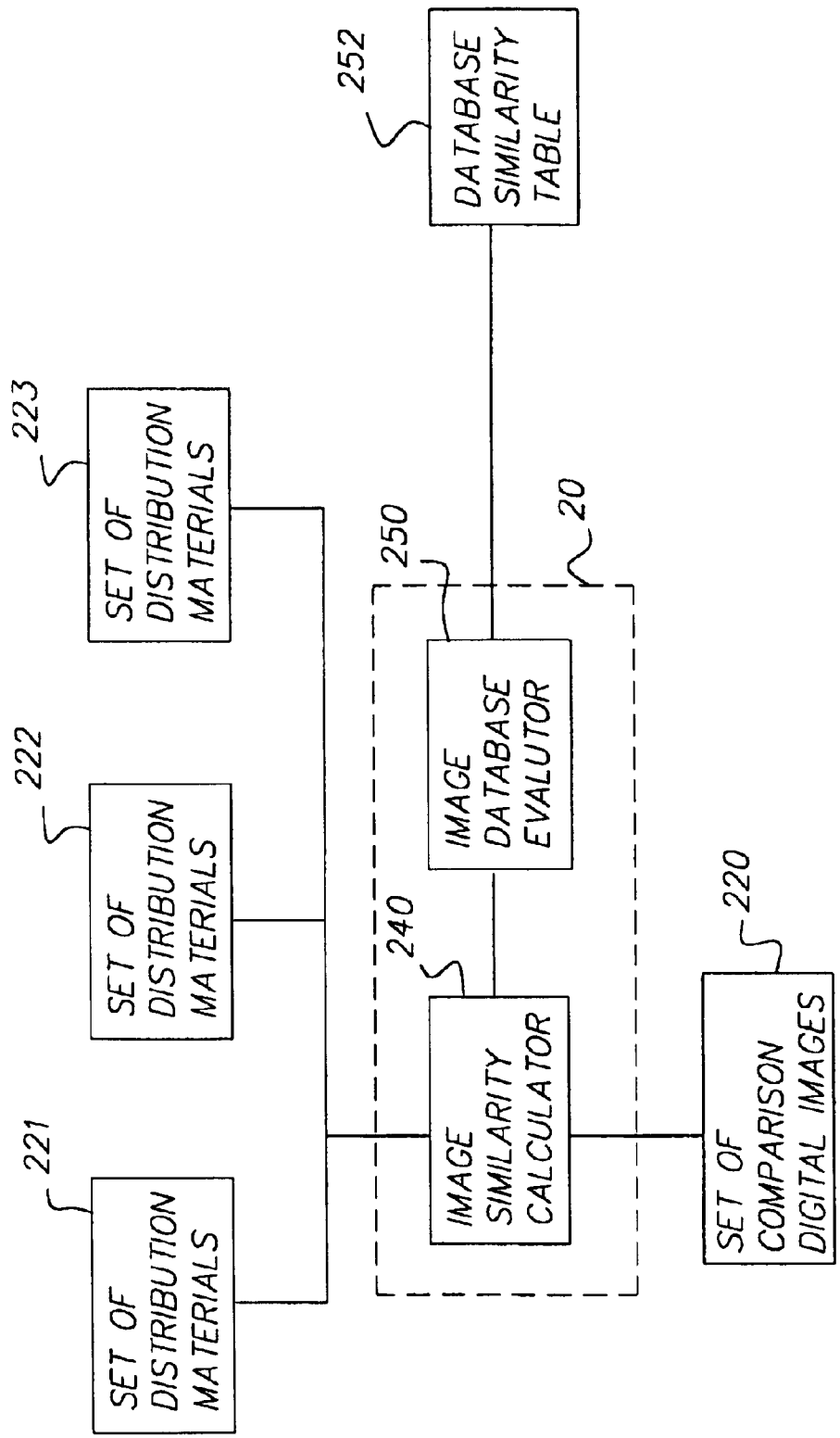
FIG. 6 is a block diagram showing the details of the digital image processor.

The digital image processor 20 as part of an image capable computer 100 shown in FIG. 4 is illustrated in more detail in FIG. 6. The image similarity calculator 240 receives multiple sets of database digital images indicated by items 221, 222, and 223 and a set of query images 220. The image similarity calculator 240 performs a numerical analysis of each digital image $Q_i$ included in the set of query images 220 with each digital image $F_{jk}$ included in each set of database digital images. The numerical analysis performed by the image similarity calculator 240 is an image-to-image comparison, i.e. a comparison of two digital images, which results in a single numerical value termed a image similarity value for each two image comparison. Thus since there are M digital images included in the set of query digital images and there are $N_j$ digital images in the $j^{th}$ set of database digital images, the total number of image-to-image comparisons performed $N_t$ is given by $$N_t = M \sum_j N_j. \qquad (5)$$

The image similarity value resulting from the image-to-image comparison of the $i^{th}$ digital image of the set of query digital images and the $k^{th}$ digital image of the $j^{th}$ set of database digital images is represented by $\beta_{ijk}$.

The image database evaluator 250 receives the image similarity values from the image similarity calculator 240 and derives a table of database similarity values. Each database similarity value is a single numerical value that relates to the degree to which set of query digital images is similar to a set of database digital images. Recall that the variable $\gamma_j$ represents the database similarity value corresponding to the $j^{th}$ set of database digital images.

The database similarity values may be calculated in variety of different ways. The preferred embodiment of the present invention uses the arithmetic mean of the image similarity values to derive a database similarity value. The equation for calculating the $\gamma_j$ is given by $$\gamma_j = \frac{1}{MN_j} \sum_{ik} \beta_{ijk} \qquad (6)$$

which represents the average similarity value.

An alternative embodiment of the present invention uses a subset of the image similarity values to calculate a database similarity value. The image similarity values $\beta_{ijk}$ (there are $M N_j$ values) corresponding the $j^{th}$ set of database digital images are ranked in numerical order. An average of only the five highest image similarity values is used to calculate the database similarity value. Those skilled in the art will recognize that the present invention can be practiced with a different number of the highest image similarity values. Using only the highest image similarity values raises the numerical values of the database similarity values. Since only a few digital images contribute to the calculation of the database similarity value no penalize is placed on the inclusion of a large number of digital images for a given set of database digital images.

Calculation of the Image Similarity Values

The present invention can be practiced with any method of producing image similarity values. The essential elements of a digital image processing method required to practice the present invention are the calculation of one or more image features for a database of digital images and a query digital image and a method for calculating a single measure of similarity of the calculated image features. For example, the present invention could be practiced with adapted versions of, but is not limited to, the methods disclosed by Cullen et al. in U.S. Pat. No. 5,933,823; Ravela et al. in U.S. Pat. No. 5,987,456; De Bonet in U.S. Pat. No. 5,819,288; Choo et al. in U.S. Pat. No. 5,832,131; Barber et al in U.S. Pat. No. 5,579,471; and described by M. J. Swain and D. H. Ballard in "*Color indexing, Intl. Journal, of Computer Vision*," Vol. 7, No. 1, 1991, pp. 11–32; and G. Pass, et al. in "*Comparing images using color coherence vectors,*" *Proceedings ACM Multimedia Conf.*, 1996 since all of these methods are image similarity methods based on one or more calculated image features.

The present invention provides a depictive feature-based image comparison system, which consists of two functional phases. In the first phase, called the image feature representation phase, every digital image in the multiple sets of database images managed by the system is processed to automatically extract its depictive feature-based representation. The image feature representation and the digital image are stored in a database and a search index is updated to enable the image feature representation to participate in future depictive feature-based image comparisons. The second phase, called the image comparison phase, is concerned with the comparison of the digital images included in the set of query digital images with the digital images included in the sets of database digital images. Note that the image color space can be transformed into any predefined or desired color space for archival and retrieval phase. The embodiment details given below are applicable to digital images of any color space (e.g., RGB, YCC, HSV, CIE color spaces, etc.). Also, digital images can be transformed to a desired compressed dynamic range in both phases to reduce the computational cost and storage requirements.

Details of the Image Feature Representation Phase

Figure 7:
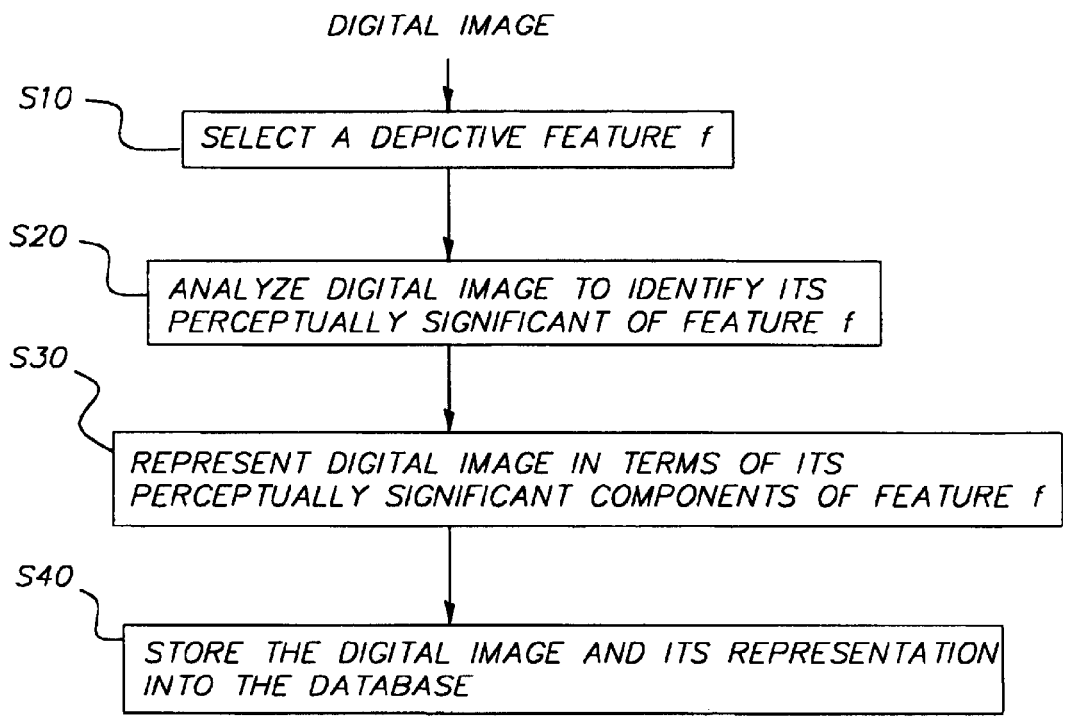
FIG. 7 is a block diagram showing the steps image feature representation phase.

The key steps of the image feature representation phase are shown in FIG. 7. Each input digital image is analyzed to build its representation. A digital image can be represented in terms of several different depictive features such as color, texture, and color composition. Referring to FIG. 7, a depictive feature f is first selected, S10. In the preferred embodiment, either color or texture can be selected. The digital image is analyzed to identify its perceptually significant components in terms of feature f, S20. A depictive feature of a digital image is considered a perceptually significant depictive feature if it dominates an observer's perception of the digital image. For example, the color red is a perceptually significant color feature in an image of a large red flower. The digital image is then represented in terms of the detected perceptually significant components of the selected feature, S30. The input digital image and its representation are then added to the image database, S40.

Figure 8:
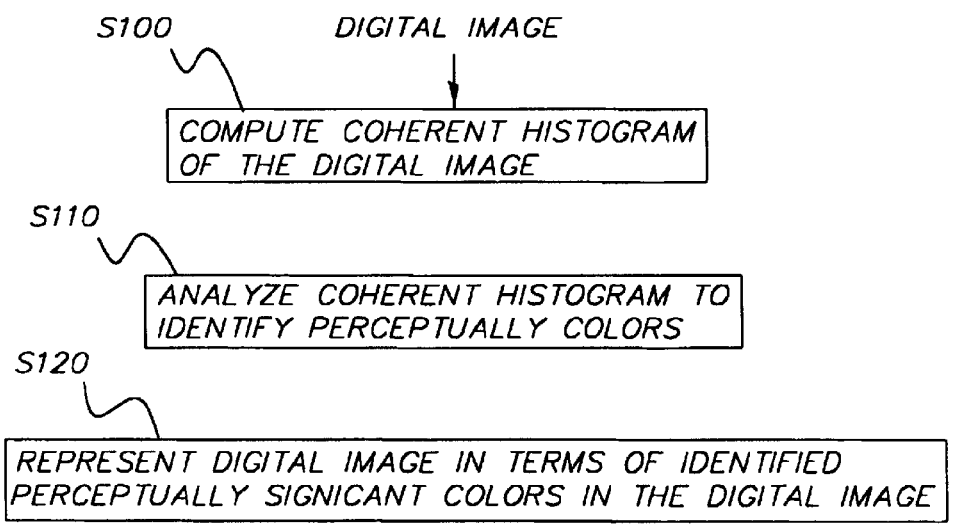
FIG. 8 is a block diagram showing the steps of computing the representation of a digital image in terms of its perceptually significant colors.

According to the present invention, color feature-based representation of a digital image is in terms of perceptually significant colors present in the digital image. The preferred approach to identifying perceptually significant colors of a digital image is based on the assumption that significantly sized coherently colored regions of a digital image are perceptually significant. Therefore, colors of significantly sized coherently colored regions are considered to be perceptually significant colors. The preferred embodiment offers two different methods for the identification of perceptually significant colors of a digital image. One of these methods is selected for setting up a database. The key steps of the first approach are shown in FIG. 8. For every input digital image, its coherent color histogram is first computed, S100. A coherent color histogram of a digital image is a function of the form H (c)=number of pixels of color c that belong to coherently colored regions. Here c is a valid color in the dynamic range of the digital image. A pixel is considered to belong to a coherently colored region if its color is equal or similar to the colors of a pre-specified minimum number of neighboring pixels. The present implementation has two definitions of coherency: (i) a minimum of 2 matching or similar neighbors, and (ii) all neighbors are matching/similar. The same coherency definition must be used for analyzing all digital images in both the image archival and retrieval phases. Two colors are considered equal if all the corresponding channel values are equal. Two colors $c_1$ and $c_2$ are considered similar if their difference diff($c_1$, $c_2$) is less than a user specified threshold $C_T$. The preferred value of $C_T$ is in the range of 15% to 20% of the maximum possible value of diff($c_1$, $c_2$). Several different color difference computation methods are possible. In the preferred embodiment one of the following three methods for comparing two L-channel colors can be selected at the system initialization time:

(i) Color $c_x$ and $c_y$ are considered similar if $|c_x^i - c_y^i| < C_T^i$, where $c_k^i$ denotes the value of the $i^{th}$ color digital image channel $c_h$ and $C_h^i$ denotes the pre-specified threshold value for the difference of the $i^{th}$ color digital image channel values.

(ii) Color $c_x$ and $c_y$ are considered similar if $\Sigma_{i=1,L} w_i \cdot (c_x^i - c_h^i)^2 < C_T$, where $c_k^i$ denotes the value of the $i^{th}$ color digital image channel $c_h$, $W_1$ is the weight of the $i^{th}$ color digital image channel, and $C_T$ denotes the pre-specified threshold value.

(iii) Color $c_x$ and $c_y$ are considered similar if $\Sigma_{i=1,L} w_i \cdot |c_x^i - c_h^i| < C_T$, where $c_k^i$ denotes the value of the $i^{th}$ color digital image channel $c_h$, $W_1$ is the weight of the $i^{th}$ color digital image channel, and $C_T$ denotes the pre-specified threshold value.

Then the coherent color histogram is analyzed to identify the perceptually significant colors, S110. A color k is considered to a perceptually significant color if H(k)>T. Here T is a threshold. In the present implementation T=0.5% of total numbers of pixels in the image. The next step is to represent the digital image in terms of its perceptually significant colors, S120. Specifically, a digital image I is represented by a vector of the form $$I_C = \{N, Z, <C_i, S_i>\}, 0 < i < N+1. \tag{7}$$

Here, N is the number of perceptually significant colors in digital image I, $Z = \Sigma S_i$, $C_i$ is the color value of the $i^{th}$ perceptually significant color of digital image I, and $S_i$ is the ratio of $H(C_i)$ and the total number of pixel in image I.

Figure 9:
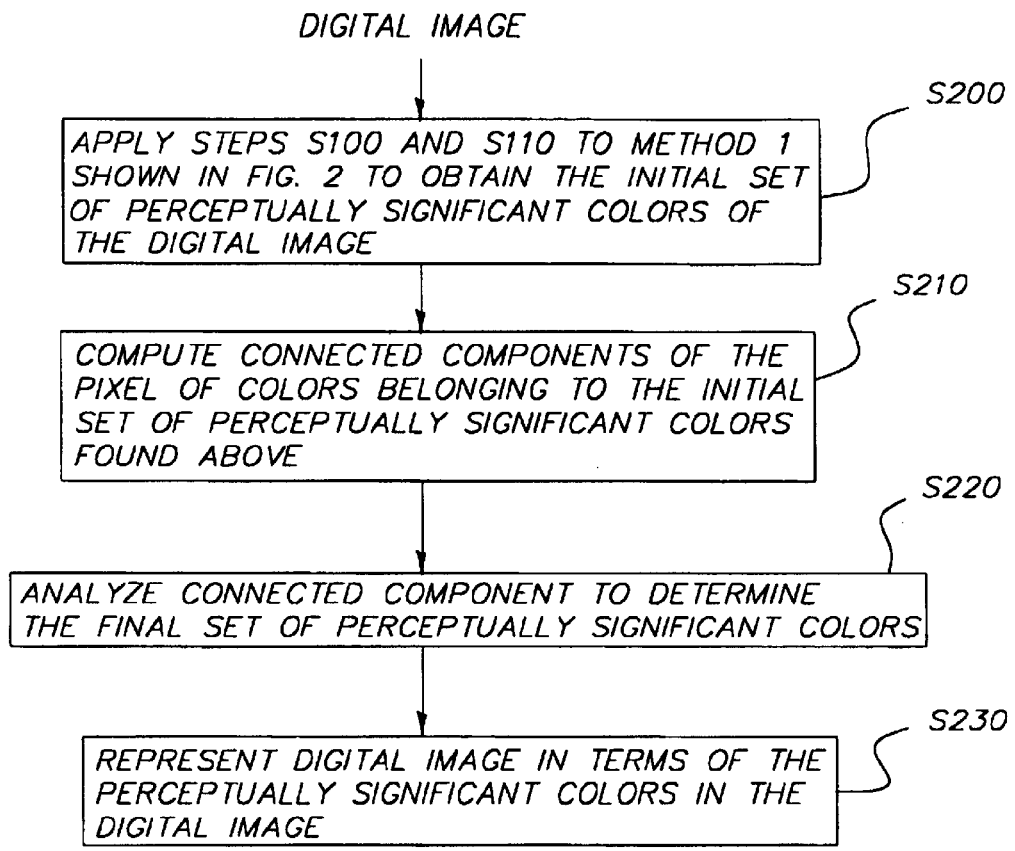
FIG. 9 is a block diagram showing the steps of the second method of computing the representation of a digital image in terms of its perceptually significant colors.

The key steps of the second method for identifying perceptually significant colors of a digital image are shown in FIG. 9. This method is an extension of the first method. In this case, steps S100 and S110 of the first method are performed to detect perceptually significant colors, S200. The set of perceptually significant colors so obtained is considered the initial set of perceptually significant colors and it is refined to obtain the set of dominant perceptually significant colors. The refinement processed starts with the finding of connected components composed solely of the pixels of colors belonging to the initial set of perceptually significant colors, S210. This is accomplished by performing connected component analysis on the input digital image considering only the pixels of perceptually significant colors (i.e., considering them as the object pixels) and ignoring others (i.e., considering them as the background pixels). Two neighboring pixels (4 or 8-neighbors) with perceptually significant colors (i.e., colors in the initial set of the perceptually significant colors) are considered connected only if they are of matching/similar colors. The connected components so obtain are analyzed to determine the set of dominant perceptually significant colors, S220. A connected component of size greater than a pre-specified threshold $T_s$ is considered a dominant perceptually significant segment. In the present implementation, $T_s$=0.25% of the total number of pixel in the digital image. Colors belonging to a dominant perceptually significant segments form the set of perceptually significant colors for image feature representation. The final step is again to represent the digital image in terms of its perceptually significant colors, S230. Note that this final set of perceptually significant colors is a subset of the initial set of perceptually significant colors.

Those skilled in art would recognize that several variations of the above two color-based image feature representations are possible within the scope of this work. For example, one straightforward extension is a combination of the two representations, where the representation of method 1 is extended by qualifying each perceptually significant color by a type which indicates whether or not that colors belongs to a dominant perceptually significant segment.

Figure 10:
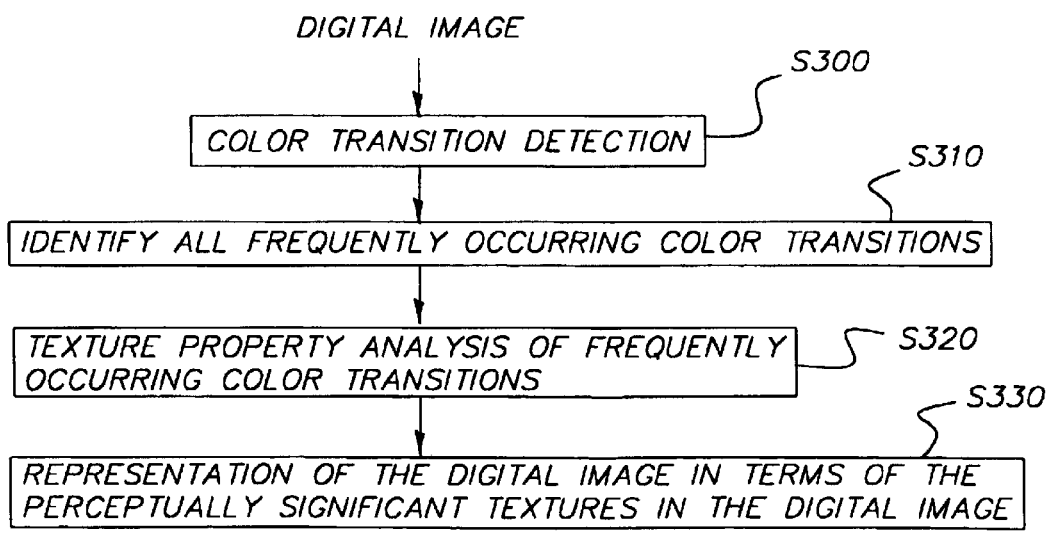
FIG. 10 is a block diagram showing the steps of computing the representation of a digital image in terms of its perceptually significant textures.
Figure 11:
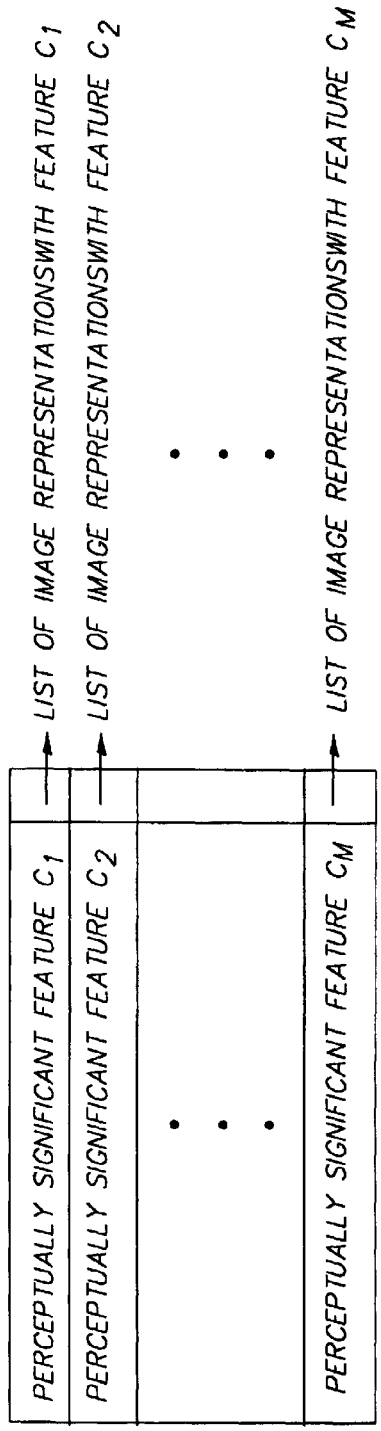
FIG. 11 is a block diagram showing the conceptual index structure used to organize a database of digital images and metadata.

According to the present invention, texture feature-based representation of a digital image is in terms of perceptually significant textures present in the digital image, random or structured. The preferred approach to identifying perceptually significant textures of a digital image is based on the assumption that each perceptually significantly texture is composed of large numbers of repetitions of the same color transition(s). Therefore, by identifying the frequently occurring color transitions and analyzing their textural properties, perceptually significant textures can be extracted and represented. The preferred embodiment for the identification of perceptually significant textures of a digital image is shown in FIG. 10. For every input digital image, the first step in the process is to detect all the color transitions that are present in the image, S300. A color transition occurs between a current pixel (c) and its previous pixel (p) if a change of color value, dist(c, p), is greater than a predefined threshold th. The preferred value of th is in the range of 15% to 20% of the maximum possible value of dist(c, p). A pixel where a color transition occurs is referred to as a color-transition-pixel. In the present embodiment, one of the following two methods for comparing two L-channel colors can be selected to determine the occurrence of a change of color value, hence, a color transition:

(i) The current pixel is identified to be a color-transition-pixel if $$|c.ch_0 - p.ch_0| \geq th.ch_0 \text{ or } |c.ch_1 - p.ch_1| \geq th.ch_1 \tag{7}$$
$$\text{or } |c.ch_i - p.ch_i| \geq th.ch_i\, 0 \leq i \leq L$$

where $c.ch_i$ represents the $i^{th}$ color digital image channel value of the current pixel, $p.ch_i$ represents the $i^{th}$ color channel value of the previous pixel, and $th.ch_i$ represents the predefined difference threshold for the $i^{th}$ color digital image channel.

(ii) The current pixel is identified to be a color-transition-pixel if $$\sqrt{\sum_{i=0,L}(c \cdot ch_i - p \cdot ch_i)^2} \geq th \tag{8}$$

where $c.ch_i$ represents the $i^{th}$ color digital image channel value of the current pixel, $p.ch_i$ represents the $i^{th}$ color digital image channel value of the previous pixel, and th represents the predefined color difference threshold.

Those skilled in art would recognize that the concept of color transition can be defined as gray-level or brightness transition in case of monochromatic images. They would also recognize that other color difference metrics can be employed for determining the existence of a color transition within the scope of this invention. A digital image is scanned horizontally and vertically to identify all color-transition-pixels using one of the above methods. Every color-transition-pixel signals a color transition and each color transition is represented by the two colors (c1, c2) corresponding to the previous and the current pixel color values that form the color transition. The second step in the process is to identify all the frequently occurring color transitions, S310. Two dimensional color transition histograms with c1 and c2 being the two dimensions are constructed to record the frequency of various color transitions found in the previous step. The preferred embodiment of the present invention offers three options for constructing and populating the color transition histograms. The first option involves the construction of a global color transition histogram, which will be populated by all the color transitions found in the image. Finding all the peaks in the color-transition histogram that also exceeds a predefined minimum frequency of occurrence threshold identifies the frequently occurring color transitions. The preferred minimum frequency threshold for identifying frequently occurring color transitions for global color transition histogram is 0.25% of the total number of pixels in the digital image. The second option involves tessellating the digital image into non-overlapping sections and then constructing a set of sectional transition histograms, which are populated by color transitions, found in corresponding image sections. In the present embodiment, a set of 24 sectional histograms is constructed. Finding all the peaks in all of the sectional transition histograms that also exceeds a predefined minimum frequency of occurrence threshold identifies the frequently occurring color transitions. The preferred minimum frequency threshold for identifying frequently occurring color transitions for sectional color transition histogram is 2.5% of the total number of pixels in each tessellated section. The final option is a combination of the two above-mentioned methods where both the global and the sectional histograms are constructed and all the peaks are identified in the above-mentioned manner. These peaks represent the most frequently occurring color transitions, which correspond to perceptually significant textures in the image. The third step in the process is texture property analysis of frequently occurring color transitions to represent perceptually significant textures, S320. For every frequently occurring color transition, all the occurrences of this particular color transition in the entire digital image are found, and a scale and a gradient value is calculated. In the current embodiment, scale is calculated as the distance in terms of pixels, between the occurrence of color c1 and color c2. Gradient is calculated as $\tan^{-1}(g_y/g_x)$ where $g_y$ and $g_x$ are the vertical and horizontal edge information at the color transition respectively, calculated using the Sobel operator. Note that other techniques for calculating scale and gradient values are possible without exceeding the scope of this invention. The calculated scale and gradient values for each occurrence are used to construct a scale-gradient histogram. After all the occurrences have been accounted, the scale-gradient histogram is used to analyze the textural properties of the perceptually significant texture. For random textures, the scale gradient histogram is randomly distributed, while for structured textures, a significantly sharp mode in scale, gradient, or both can be detected in the scale-gradient histogram. For a color transition corresponding to a random texture, the scale-gradient histogram is used to compute the scale-gradient mean vector and the scale-gradient co-variance matrix. For a color transition corresponding to a structured texture, the corresponding histogram mode is used to compute the scale-gradient mean vector and the scale-gradient co-variance matrix. These properties are used to represent a perceptually significant texture. The final step is to represent a digital image in terms of its perceptually significant textures, S330. A digital image I is represented by a vector of the form:

$$I_T = \{N, Z, <C^1_i, C^2_i, P_i, M_i, V_i, S_i>\}, 0<i<N+1. \quad (9)$$

Here N is the number of dominant perceptually significant textures in image I; $Z=\Sigma S_i$; $C^1_i$ nd $C^2_i$ are the color value of the frequently occurring color transition corresponding to the $i^{th}$ perceptually significant texture; $P_i$ is the textural type of the $i^{th}$ perceptually significant texture, taking on one of the following possible values: random, scale-structured, gradient-structured, or scale-gradient-structured; $M_i$ and $V_i$ are the scale-gradient mean vector and scale-gradient covariance matrix of the $i^{th}$ perceptually significant texture in the set, respectively, and $S_i$ is the total area coverage of the $i^{th}$ perceptually significant texture calculated by accumulating all the scale values over all the occurrences of the frequently occurring color transition corresponding to the $i^{th}$ perceptually significant texture. Those skilled in art would recognize that other textural properties, or a subset/superset of $I_T$ can be employed to represent a perceptually significant texture.

After generating the perceptually significant feature-based image feature representation, the next step is to insert the digital image and the associated representation into the corresponding database and appropriate index structures. Those skilled in art would recognize that the overall database organization is dependent on the underlying database/file management system. In the present implementation, the digital images reside in the image database. The image feature representations (metadata) are also stored in the database, as well as in the indexing structures. In addition to the perceptually significant feature representations, an image feature representation (metadata) also contains the image identifier/locator which act as a reference to the digital image file. The image name/id acts as a locator of its representation. Note that in the current implementation color and texture representations are organized in separate structures, but they share the common digital image.

The steps outlined in FIG. 7, FIG. 8, FIG. 9, and FIG. 10 are repeated for all the digital images in each set of database digital images. This represents a database of digital images and metadata that does not need to be changed unless a new set of database digital images is to be included. The present invention may also be practiced with the many different sets of query digital images. However, for each set of query digital images the steps outlined in FIG. 7, FIG. 8, FIG. 9, and FIG. 10 are repeated for all the digital images in each set of query digital images. A separate database and index structure is maintained for each set of query digital images. Therefore, the present invention may be used with multiple sets of query digital images and use the same sets of database digital images and corresponding database and index structure.

Image Comparison Phase

In the image comparison phase, each query digital image in the set of query digital images is analyzed separately. A image similarity value is computed for the comparison between a query digital image and a database digital image. This process is repeated for all the query images. Before a similarity value is calculated between a query digital image and a database digital image, certain constraints must be satisfied by the database image with respect to the query image. In the preferred embodiment of the present invention, these constraints on the perceptually significant features are: (i) minimum number perceptually significant query digital image's features that are present in the database image's features; (ii) the minimum percentage of the total size of the perceptually significant features that are common between the query digital image and the database digital image; and (iii) a logical combination of the first two constraints. To accomplish this, the appropriate index search is first performed to select database digital images that contain one or more perceptually significant features (or principal perceptually significant features if principal perceptually significant feature-based index is employed) of the query digital image. The representation of every selected database digital image is then analyzed to determine if it satisfies the specified size constraints mentioned above, and for database digital images that satisfy the constraints, a measure of similarity with the query digital image, or image similarity value, is computed. For the database digital image which are not selected as part of the above procedure, a image similarity value of zero is given since the comparison between the query digital image and the database digital image did not satisfy the constrains on the perceptually significant features.

Figure 12:
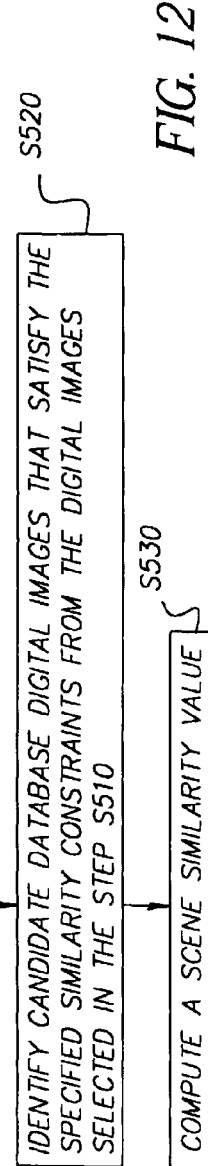
FIG. 12 is a block diagram showing the steps of computing the image similarity value based on perceptually significant colors and/or textures.

The key steps of the example image-based similar image retrieval/selection process are shown in FIG. 12. Given a query digital image, its desired representation (i.e., color or texture-based) is computed shown in step S500. Next, the database and the associated index structure is searched to find candidate database digital images that can potentially meet the search criteria, S510. This is accomplished by searching the index structure to identify digital images that contain at least one perceptually significant feature (or principal perceptually significant feature if principal perceptually significant feature-based representation is employed) common with the query digital image (as indicated in step S520). For the preferred index structure, this is accomplished by searching the index structure for every perceptually significant (or principal perceptually significant) feature $f_p$ to find database digital images with feature $f_p$ as a perceptually significant (or principal perceptually significant) feature. For each database digital image that satisfies the search/retrieval constraints, a image similarity value is computed. For database digital images that do not satisfy the search/retrieval constraints, a image similarity value of zero is assigned.

For color-based image comparison, the index structure based on perceptually significant or principal perceptually significant colors is searched to find database digital images containing in their representation at least one of the query digital image's perceptually significant (or principal perceptually significant) color. The preferred options for a measure of similarity, the calculation of the image similarity value as indicated in step S520, for the color-based representations are:

(a)

$$D(q, d) = \sum_{i=1}^{K} \min(S_i^q, S_i^d) \qquad (10)$$

(b)

$$D(q, d) = \text{diff}(\Omega^q, \Omega^d) \qquad (11)$$

where in N is the number of matching colors of query digital image q and database digital image d; $S_i^q$ and $S_i^d$ are the size attribute values for the $i^{th}$ matching color of images q and d, respectively; diff is a normalized distance function of the type $L_x|.|$ norm for a given x; and $\Omega_q$ and $\Omega_d$ are the set of size attribute values of the corresponding perceptually significant colors of digital images q and d.

For texture-based image comparison, the index structure based on perceptually significant (or principal perceptually significant) textures is searched to find database digital images that both contain at least one of the query digital image's perceptually significant (or principal perceptually significant) textures in their representation. The resulting set of candidate database digital images is further compared with the query digital image to determine the candidate's texture-based similarity to the query image. The preferred measure of similarity between the query digital image and the candidate digital image is dependent on the similarity of matching, or common, perceptually significant textures, and also the total area coverage in the query digital image and the candidate digital image by the matching/common perceptually significant textures. Two perceptually significant textures are matching/common if they have matching color values C1, C2, and the same texture property value P (random or structured) in their representation. In the preferred embodiment, for each matching/common perceptually significant texture, the similarity of matching perceptually significant texture, the image similarity value, is calculated from the scale-gradient mean vector M and the scale-gradient covariance matrix V using either Euclidean distance or Mahalanobis distance. Note that other distance functions may also be used within the scope of the present invention. The overall image similarity score between the candidate and the query digital image is determined as the sum of the similarity value of all the matching perceptually significant textures multiplied by the relative area coverage S of the texture in the digital image. Note that in general, the Mahalanobis distance is not a symmetric distance, the distance from distribution A to distribution B is different from the distance from distribution B to distribution A. In addition, the relative area coverage S is different in the candidate and the query digital image. Therefore, two image similarity values generally result from the similarity calculation: one from the query to the candidate $S_{q-c}$, and one from the candidate to the query $S_{c-q}$. The preferred embodiment has 5 different options for obtaining one single image similarity value. The first two options take either $S_{q-c}$ or $S_{c-q}$ as the final image similarity value; the third option takes the maximum of $S_{q-c}$ and $S_{c-q}$; the fourth option takes the average of $S_{q-c}$ and $S_{c-q}$; and the fifth option takes the product of $S_{q-c}$ and $S_{c-q}$. Other combinatorial methods can also be used without exceeding the scope of the present invention.

The calculation of the image similarity value as described in the preferred embodiment of the present invention which includes index structure searches and similarity calculation only on the candidate database images can result in many query/database digital image comparisons that have a zero value. In an alternative embodiment of the present invention, the indexing structure can be eliminated. In this embodiment, every database digital image will be selected for further evaluation. The method of calculating the image similarity value is employed as in the preferred embodiment as indicated by equations (10) and (11).

Those skilled in art would recognize that other similarity measures could be employed within the scope of the present invention.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for practicing a method according to the present invention.

The invention has been described in detail with particular reference to certain preferred embodiments thereof, but it will be understood that variations and modifications can be effected within the spirit and scope of the invention.

Parts List 10 image capture device
20 digital image processor
30 image output device
40 general control processor
42 monitor device
46 offline memory device
100 image capable computer
110 communications computer network
120 connection computer
130 retail computer
140 wholesale computer
150 personal computer
160 mobile computer
170 kiosk computer
201 active image
202 thumbnail image
203 thumbnail image
204 thumbnail image
205 thumbnail image
206 thumbnail image
207 thumbnail image
210 distribution item
211 distribution item
212 distribution item
220 set of query digital images
221 set of database digital images
222 set of database digital images
223 set of database digital images
231 set of distribution materials Parts List (con't)

232 set of distribution materials
233 set of distribution materials
240 image similarity calculator
250 image database evaluator
252 database similarity table
254 database ranking table
280 distribution controller

What is claimed is:

1. A method of analyzing one or more images of a user to determine the likelihood of user interest in product or promotional materials that can be sent to the user, comprising:
   a) selecting one or more images having pixels by a user;
   b) providing a plurality of product and promotional materials;
   c) automatically analyzing, without using the product or promotional materials, the pixels of the one or more user images to determine the likelihood that one or more particular product or promotional materials will be of interest to the user; and
   d) selecting one or more of the product or promotional materials based on their likelihood of interest to the user.

2. A computer storage product having at least one computer storage medium having instructions stored therein causing one or more computers to perform the method of claim 1.

3. A method of analyzing one or more images of a user to determine the likelihood of user interest in product or promotional materials that can be sent to the user, comprising:
   a) receiving one or more user images having pixels from the user;
   b) storing in a database sets of database images, and sets of product or promotional materials, wherein each set of product or promotional materials corresponds to a different set of database images;
   c) automatically analyzing the pixels of the one or more user images and the received database images to determine based upon the analysis if there is a likelihood that one or more of sets of product or promotional materials will be of interest to the user; and
   d) selecting the one or more likely sets of product or promotional materials based on their likelihood of interest to the user.

4. The method of claim 3 further including:
   e) automatically extracting a representation from the one or more sets of database images in terms of one or more features that characterize the one or more sets of database images; and
   f) storing the one or more sets of database image and the representation in a database.

5. The method according to claim 4 wherein features are color or texture.

6. The method of claim 3 wherein the one or more sets of product or promotional materials includes services.

7. The method of claim 3 wherein the one or more sets of product or promotional materials include at least one website.

8. The method of claim 3 wherein the analysis includes performing an image similarity calculation with respect to the user images and database images.

9. The method of claim 3 further including sending the one or more selected product or promotional materials to the user.

10. The method of claim 3 further including automatically extracting representations from the received user images in terms of one or more features that characterize the user images and storing the received user images and the extracted representations in a database.

11. The method according to claim 10 wherein features are color or texture.

12. The method of claim 3 further including automatically extracting from the one or more sets of database images in terms of one or more perceptually significant depictive features that dominate a perception of the one or more sets of database images and storing the one or more sets of database images and the extracted representations in a database.

13. The method according to claim 12 wherein features are color or texture.

* * * * *